United States Patent
Oyobe et al.

(10) Patent No.: US 8,297,391 B2
(45) Date of Patent: Oct. 30, 2012

(54) POWER SUPPLY SYSTEM, VEHICLE PROVIDED WITH THE SAME, POWER SUPPLY SYSTEM CONTROL METHOD AND COMPUTER-READABLE RECORDING MEDIUM BEARING PROGRAM FOR CAUSING COMPUTER TO CONTROL THE POWER SUPPLY SYSTEM

(75) Inventors: Hichirosai Oyobe, Toyota (JP); Wanleng Ang, Toyota (JP); Shinji Ichikawa, Toyota (JP); Hiroshi Yoshida, Anjo (JP); Hiroki Sawada, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 887 days.

(21) Appl. No.: 12/227,831

(22) PCT Filed: Jun. 13, 2007

(86) PCT No.: PCT/JP2007/062372
§ 371 (c)(1),
(2), (4) Date: Nov. 28, 2008

(87) PCT Pub. No.: WO2008/004440
PCT Pub. Date: Jan. 10, 2008

(65) Prior Publication Data
US 2009/0183934 A1    Jul. 23, 2009

(30) Foreign Application Priority Data

Jul. 7, 2006    (JP) .................................. 2006-188273

(51) Int. Cl.
*H02J 3/46*    (2006.01)

(52) U.S. Cl. ..................................... 180/65.275; 307/80
(58) Field of Classification Search ................. 180/65.1, 180/65.21, 65.22, 65.225, 65.265, 65.29, 180/65.31, 65.8, 65.275; 318/105, 85, 106, 318/109; 701/22; 307/10.1, 45, 46, 80; 477/7; 322/40
See application file for complete search history.

(56) References Cited

U.S. PATENT DOCUMENTS 5,099,186 A * 3/1992 Rippel et al. ................... 318/803
(Continued)

FOREIGN PATENT DOCUMENTS

JP    A-7-245808    9/1995
(Continued)

OTHER PUBLICATIONS

Office Action issued in Russian Patent Application No. 2009104068 mailed on May 6, 2010. (with English-language translation).

(Continued)

*Primary Examiner* — Katy M Ebner
*Assistant Examiner* — Emma K Frick
(74) *Attorney, Agent, or Firm* — Oliff & Berridge, PLC

(57) ABSTRACT

First and second converters are connected in parallel to positive and negative lines, respectively. When a required power is smaller than a reference value, an ECU controls the first and second converters such that one of the first and second converters operates and the other stops. When the required power is equal to or larger than the reference value, the ECU controls the first and second converters such that both the first and second converters operate.

8 Claims, 9 Drawing Sheets

U.S. PATENT DOCUMENTS

| | | | | |
|---|---|---|---|---|
| 5,373,195 A * | 12/1994 | De Doncker et al. | 307/45 |
| 5,710,699 A * | 1/1998 | King et al. | 363/132 |
| 5,929,595 A * | 7/1999 | Lyons et al. | 320/104 |
| 5,994,789 A * | 11/1999 | Ochiai | 307/10.1 |
| 6,114,775 A * | 9/2000 | Chung et al. | 307/10.1 |
| 6,608,396 B2 * | 8/2003 | Downer et al. | 290/40 C |
| 6,630,804 B2 * | 10/2003 | Moriya et al. | 318/85 |
| 6,917,179 B2 * | 7/2005 | Komatsu et al. | 318/700 |
| 6,930,460 B2 * | 8/2005 | Ishikawa et al. | 318/442 |
| 7,164,253 B2 * | 1/2007 | Sato et al. | 318/801 |
| RE41,303 E * | 5/2010 | Komatsu et al. | 318/700 |
| 7,755,213 B2 * | 7/2010 | Ang | 307/10.1 |
| 7,898,103 B2 * | 3/2011 | Oyobe et al. | 307/9.1 |
| 7,928,603 B2 * | 4/2011 | Ichikawa | 307/45 |
| 7,956,489 B2 * | 6/2011 | Ichikawa et al. | 307/10.1 |
| 2003/0107352 A1 * | 6/2003 | Downer et al. | 322/40 |
| 2003/0146726 A1 * | 8/2003 | Ishikawa et al. | 318/442 |
| 2004/0124808 A1 * | 7/2004 | Hirono | 318/806 |
| 2004/0150365 A1 | 8/2004 | Ochiai | |
| 2009/0183934 A1 * | 7/2009 | Oyobe et al. | 180/65.265 |
| 2010/0044131 A1 * | 2/2010 | Teraya | 180/65.265 |
| 2010/0145560 A1 * | 6/2010 | Komatsu et al. | 701/22 |
| 2011/0040436 A1 * | 2/2011 | Yamamoto et al. | 701/22 |
| 2011/0160019 A1 * | 6/2011 | Harada | 477/7 |

FOREIGN PATENT DOCUMENTS

| | | | |
|---|---|---|---|
| JP | A-7-274378 | 10/1995 | |
| JP | A-2001-177914 | 6/2001 | |
| JP | A-2002-10502 | 1/2002 | |
| JP | A-2003-32901 | 1/2003 | |
| JP | A-2003-209969 | 7/2003 | |
| JP | A-2003-274565 | 9/2003 | |
| JP | 2003-309997 | * 10/2003 | |
| JP | A-2003-309997 | 10/2003 | |
| JP | A-2004-15866 | 1/2004 | |
| JP | A-2005-312160 | 11/2005 | |
| JP | A-2006-158173 | 6/2006 | |
| RU | 2 223 183 C2 | 2/2004 | |

OTHER PUBLICATIONS

Office Action issued in South Korean Patent Application No. 10-2009-7001964 mailed on Oct. 18, 2010. (with English-Language translation).

* cited by examiner

POWER SUPPLY SYSTEM, VEHICLE PROVIDED WITH THE SAME, POWER SUPPLY SYSTEM CONTROL METHOD AND COMPUTER-READABLE RECORDING MEDIUM BEARING PROGRAM FOR CAUSING COMPUTER TO CONTROL THE POWER SUPPLY SYSTEM

TECHNICAL FIELD

The present invention relates to a control technique for suppressing a loss in a power supply system provided with a plurality of power storage devices.

BACKGROUND ART

Japanese Patent Laying-Open No. 2003-209969 has disclosed a power supply control system provided with a plurality of power supply stages. This power supply control system includes a plurality of power supply stages that are connected in parallel together and supply a DC power to at least one inverter. Each power supply stage includes a battery and a boost/back-boost DC-DC converter.

In this power supply control system, the plurality of power supply stages are controlled such that a plurality of batteries included in each of the power supply stages are uniformly charged and discharged to maintain an output voltage for the inverter.

However, the above Japanese Patent Laying-Open No. 2003-209969 has merely disclosed that the plurality of power supply stages are connected in parallel and are operated to charge and discharge uniformly the plurality of batteries included in each of the power supply stages, and has not particularly discussed a method of controlling each power supply stage for suppressing a loss in the whole power supply control system.

DISCLOSURE OF THE INVENTION

An object of the invention is to provide a power supply system provided with a plurality of power storage devices and a plurality of voltage converting devices, and particularly to provide a power supply system that can suppress a loss as well as a vehicle provided with the power supply system.

Another object of the invention is to provide a control method that can suppress a loss in a power supply system provided with a plurality of power storage devices and a plurality of voltage converting devices.

Further another object of the invention is to provide a computer-readable recording medium bearing a program for causing a computer to perform control that can suppress a loss in a power supply system provided with a plurality of power storage devices and a plurality of voltage converting devices.

According to the invention, a power supply system provided with a plurality of power storage devices includes first and second voltage converting devices, and a control unit controlling the first and second voltage converting devices. The first voltage converting device is arranged between a first power storage device and a load device for converting a voltage provided from the first power storage device and providing the converted voltage to the load device. The second voltage converting device is arranged between the second power storage device and the load device for converting a voltage provided from the second power storage device and providing the converted voltage to the load device. When a required power required of the power supply system is smaller than a reference value, the control unit controls the first and second voltage converting devices such that one of the first and second voltage converting devices operates and the other voltage converting device stops. When the required power is equal to or larger than the reference value, the control unit controls the first and second voltage converting devices such that both the first and second voltage converting devices operate.

Preferably, when the required power is smaller than the reference value, the control unit stops the voltage converting device corresponding to one of the first and second power storage devices providing a lower output voltage than the other.

Preferably, the reference value is determined based on a resistance loss in the first and second power storage devices and a switching loss in the first and second voltage converting devices.

Preferably, the control unit changes the reference value such that the reference value increases as a temperature of the first and second power storage devices becomes high.

Preferably, the control unit changes the reference value such that the reference value increases as a state of charge representing a charged state of the first and second power storage devices becomes high.

Preferably, the control unit changes the reference value such that the reference value increases as a switching frequency of the first and second voltage converting devices becomes high.

Preferably, one of the first and second power storage devices includes a secondary battery, and the other of the first and second power storage devices includes a capacitor.

Also, according to the invention, a vehicle includes one of the power supply systems described above, a drive device supplied with an electric power from the power supply system, an electric motor driven by the drive device, and a wheel driven by the electric motor.

Further, according to the invention, a power supply system control method is a method of controlling a power supply system provided with a plurality of power storage devices. The power supply system includes first and second voltage converting devices. The first voltage converting device is arranged between a first power storage device and a load device for converting a voltage provided from the first power storage device and providing the converted voltage to the load device. The second voltage converting device is arranged between the second power storage device and the load device for converting a voltage provided from the second power storage device and providing the converted voltage to the load device. The power supply system control method includes a first step of comparing a required power required of the power supply system with a reference value; a second step of controlling the first and second voltage converting devices such that one of the first and second voltage converting devices operates and the other voltage converting device stops, when the required power is smaller than the reference value; and a third step of controlling the first and second voltage converting devices such that both the first and second voltage converting devices operate, when the required power is equal to or larger than the reference value.

Preferably, the second step includes of a first sub-step of comparing an output voltage of the first power storage device with an output voltage of the second power storage device, a second sub-step of stopping the first voltage converting device when the output voltage of the first power storage device is lower than the output voltage of the second power storage device, and a third sub-step of stopping the second voltage converting device when the output voltage of the second power storage device is lower than the output voltage of the first power storage device.

Preferably, the reference value is determined based on a resistance loss in the first and second power storage devices and a switching loss in the first and second voltage converting devices.

Preferably, the reference value is set to increase as a temperature of the first and second power storage devices becomes high.

Preferably, the reference value is set to increase as a state of charge indicating a charged state of the first and second power storage devices becomes high.

Preferably, the reference value is set to increase as a switching frequency of the first and second voltage converting devices becomes high.

Further, according to the invention a recording medium is a computer-readable recording medium storing a program for causing a computer to control a power supply system provided with a plurality of power storage devices. The power supply system includes first and second voltage converting devices. The first voltage converting device is arranged between a first power storage device and a load device for converting a voltage provided from the first power storage device and providing the converted voltage to the load device. The second voltage converting device is arranged between the second power storage device and the load device for converting a voltage provided from the second power storage device and providing the converted voltage to the load device. The recording medium stores the program for causing the computer to execute a first step of comparing a required power required of the power supply system with a reference value; a second step of controlling the first and second voltage converting devices such that one of the first and second voltage converting devices operates and the other voltage converting device stops, when the required power is smaller than the reference value; and a third step of controlling the first and second voltage converting devices such that both the first and second voltage converting devices operate, when the required power is equal to or larger than the reference value.

According to the invention, the first voltage converting device is arranged between the first power storage device and the load device, and the second voltage converting device is arranged between the second power storage device and the load device. Thus, the first and second voltage converting devices are connected in parallel to the load device, convert the voltages provided from the corresponding power storage devices and provide them to the load device, respectively. A resistance loss in the power storage device is proportional to the square of the current. When the power required of the power supply system is small, the switching loss in the voltage converting device is relatively larger than the resistance loss in the power storage device. Accordingly, by reducing the number of the voltage converting devices to be operated, the loss in the whole power supply system can be suppressed. When the required power is large, the resistance loss can be reduced by operating both the first and second voltage converting devices to distribute the load to the first and second power storage devices. Thereby, the loss in the whole power supply system can be suppressed. In this invention, therefore, the control unit performs the control such that one of the first and second voltage converting devices operates and the other stops, when the required power is smaller than the reference value. Also, it performs the control such that both the first and second voltage converting devices operate, when the required power is equal to or larger than the reference value. In this invention, therefore, the loss in the power supply system can be suppressed.

BEST MODES FOR CARRYING OUT THE INVENTION

Embodiments of the invention will now be described with reference to the drawings. In the following description, the same or corresponding parts and components bear the same reference numbers, and description thereof is not repeated.

First Embodiment

Figure 1:
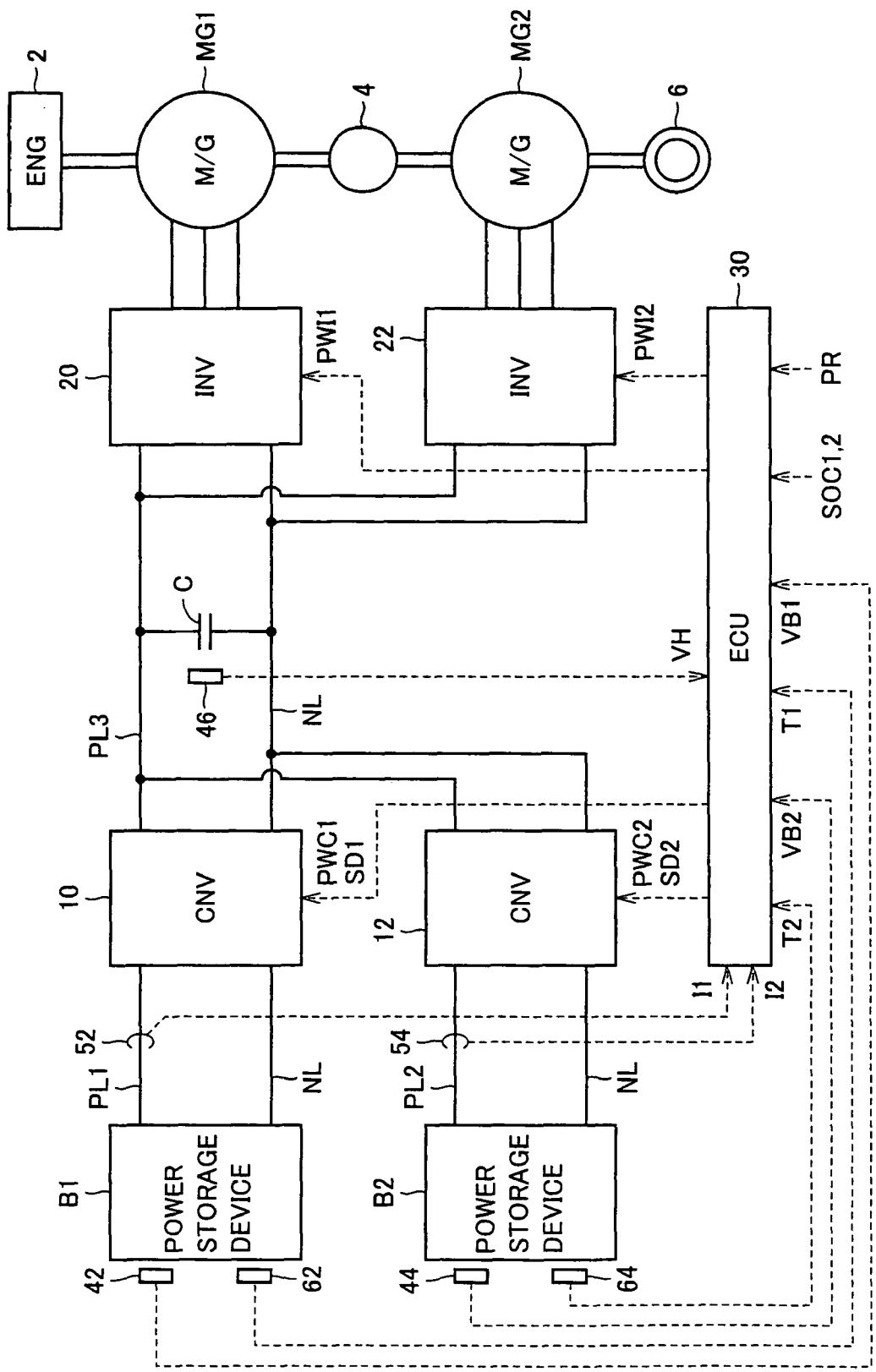
FIG. 1 is a whole block diagram of a hybrid vehicle represented as an example of a vehicle carrying a power supply system according to the invention.

FIG. 1 is a whole block diagram of a hybrid vehicle which is shown as an example of a vehicle carrying a power supply system according to the invention. Referring to FIG. 1, a hybrid vehicle 100 includes an engine 2, motor generators MG1 and MG2, a power split device 4 and wheels 6. Hybrid vehicle 100 also includes power storage devices B1 and B2, converters 10 and 12, a capacitor C, inverters 20 and 22, and an ECU (Electronic Control Unit) 30. Further, hybrid vehicle 100 includes voltage sensors 42, 44 and 46, current sensors 52 and 54, and temperature sensors 62 and 64.

Hybrid vehicle 100 runs using engine 2 and motor generator MG2 as power sources. Power split device 4 is coupled between engine 2 and motor generators MG1 and MG2 for distributing the power to them. Power split device 4 is formed, e.g., of a planetary gear mechanism having three rotation axes, i.e., a sun gear, a planetary carrier and a ring gear, and these three rotation axes are connected to rotation axes of engine 2 and motor generators MG1 and MG2, respectively. Motor generator MG1 may have a hollow rotor, through which a crankshaft of engine 2 extends coaxially so that engine 2 and motor generators MG1 and MG2 can be mechanically connected to power split device 4. A rotation axis of motor generator MG2 is coupled to wheels 6 via a reduction gear and a differential gear that are not shown.

Motor generator MG1 is incorporated into hybrid vehicle 100 for operating as a power generator driven by engine 2 and also operating as an electric motor that can start engine 2. Motor generator MG2 is incorporated into hybrid vehicle 100 as an electric motor driving wheels 6.

Power storage devices B1 and B2 are DC power supplies that can be charged and discharged, and are made of, e.g., secondary batteries such as nickel hydrogen batteries or lithium ion batteries. Power storage device B1 supplies an electric power to converter 10, and is charged by converter 10 during power regeneration. Power storage device B2 supplies an electric power to converter 12, and is charged by converter 12 during power regeneration.

For example, power storage device B1 may be made of a secondary battery having a larger maximum output power than power storage device B2, and power storage device B2 may be made of a second battery having a larger electricity storage capacity than power storage device B1. Thereby, two power storage devices B1 and B2 can form a high-power DC power supply of a large capacity. A capacitor of a large capacitance may be used as one of power storage devices B1 and B2.

Converter 10 boosts a voltage provided from power storage device B1 based on a signal PWC1 from ECU 30, and provides the boosted voltage to a positive line PL3. Converter 10 steps down the voltage of the regenerative power supplied from inverters 20 and 22 through positive line PL3 to the voltage level of power storage device B1, and charges power storage device B1 with it. Also, converter 10 stops the switching operation when it receives a shut-down signal SD1 from ECU 30.

Converter 12 is arranged in parallel with converter 10 and is connected to positive and negative lines PL3 and NL. Converter 12 boosts a voltage from power storage device B2 based on a signal PWC2 from ECU 30, and provides the boosted voltage to positive line PL3. Converter 12 steps down the regenerative power supplied through positive line PL3 from inverters 20 and 22 to the voltage level of power storage device B2 based on signal PWC2, and charges power storage device B2 with it. Further, converter 12 stops the switching operation when it receives a shut-down signal SD2 from ECU 30.

Capacitor C is connected between positive line PL3 and negative line NL for smoothing variations in voltage between positive line PL3 and negative line NL.

Inverter 20 converts a DC voltage provided from positive line PL3 into a three-phase AC voltage based on a signal PWI1 from ECU 30, and provides the converted three-phase AC voltage to motor generator MG1. Inverter 20 converts the three-phase AC voltage generated by motor generator MG1 using the power of engine 2 into a DC voltage based on signal PWI1, and provides the converter DC voltage to positive line PL3.

Inverter 22 converts the DC voltage provided from positive line PL3 into a three-phase AC voltage based on a signal PWI2 from ECU 30, and provides the converted three-phase AC voltage to motor generator MG2. During regenerative braking of the vehicle, motor generator MG2 receiving a rotational power from wheels 6 generates the three-phase AC voltage, and inverter 22 converts the three-phase AC voltage thus generated into a DC voltage based on signal PWI2, and provides the converted AC voltage to positive line PL3.

Each of motor generators MG1 and MG2 is a three-phase AC rotary electric motor, and is formed of a three-phase AC synchronous motor generator, for example. Motor generator MG1 is regeneratively driven by inverter 20 to provide the three-phase AC voltage that is generated using the power of engine 2 to inverter 20. In a starting operation of engine 2, power running of motor generator MG1 is performed by inverter 20 to crank engine 2. Power running of motor generator MG2 is performed by inverter 22 to generate a drive power for driving wheels 6. In a regenerative braking operation of the vehicle, regenerative running of motor generator MG2 is performed by inverter 22 to generate the three-phase AC voltage using the rotational power provided from wheels 6 and provide it inverter 22.

Voltage sensor 42 detects a voltage VB1 of power storage device B1, and provides it to ECU 30. Temperature sensor 62 detects a temperature T1 of power storage device B1, and provides it to ECU 30. Current sensor 52 detects a current I1 provided from power storage device B1 to converter 10, and provides it to ECU 30. Voltage sensor 44 detects a voltage VB2 of power storage device B2, and provides it to ECU 30. Temperature sensor 64 detects a temperature T2 of power storage device B2, and provides it to ECU 30. Current sensor 54 detects a current I2 provided from power storage device B2 to converter 12, and provides it to ECU 30. Voltage sensor 46 detects a voltage across terminals of capacitor C, i.e., a voltage VH on positive line PL3 with respect to negative line NL, and provides detected voltage VH to ECU 30.

ECU 30 produces signals PWC1 and PWC2 for driving converters 10 and 12, and provides these signals PWC1 and PWC2 to converters 10 and 12, respectively. Further, ECU 30 produces shut-down signal SD1 or SD2 according to a power required of power storage devices B1 and B2 (which will be merely referred to as a "required power" hereinafter). ECU 30 provides shut-down signal SD1 or SD2 thus produced to converter 10 or 12. Required power PR is calculated by a vehicle ECU (not shown) based on an accelerator press-down degree and a vehicle speed.

Further, ECU 30 produces signals PWI1 and PWI2 for driving inverters 20 and 22, respectively, and provides these signals PWI1 and PWI2 to inverters 20 and 22, respectively.

Figure 2:
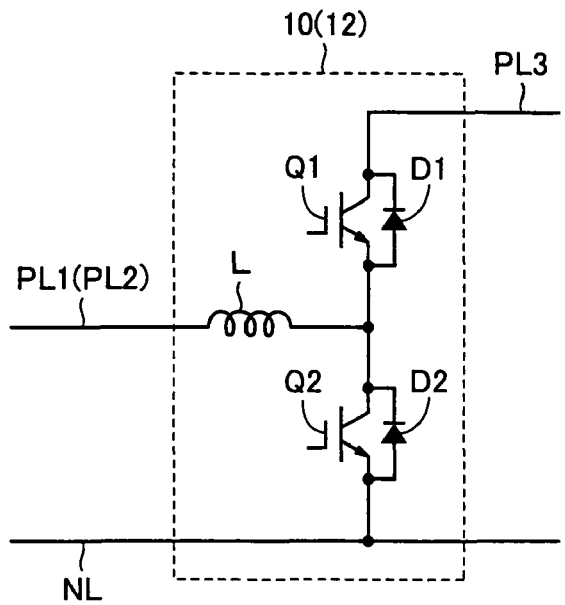
FIG. 2 is a circuit diagram showing a structure of a converter shown in FIG. 1.

FIG. 2 is a circuit diagram showing a structure of converters 10 and 12 shown in FIG. 1. Referring to FIG. 2, converter 10 (12) includes npn transistors Q1 and Q2, diodes D1 and D2, and a reactor L. Npn transistors Q1 and Q2 are connected in series between positive line PL3 and negative line NL. Diodes D1 and D2 are connected in antiparallel to npn transistors Q1 and Q2, respectively. One end of reactor L is connected to a connection node between npn transistors Q1 and Q2, and the other end is connected to a positive line PL1 (PL2). The npn transistor described above may be formed of, e.g., IGBT (Insulated Gate Bipolar Transistor).

Converter 10 (12) is formed of a chopper circuit. Converter 10 (12) boosts the voltage on positive line PL1 (PL2) based on signal PWC1 (PWC2) from ECU 30 (not shown) using reactor L, and provides the boosted voltage to positive line PL3.

More specifically, converter 10 (12) boosts the voltage on positive line PL1 (PL2) by accumulating the current that flows when npn transistor Q2 is on in reactor L as a magnetic field energy. Converter 10 (12) provides the boosted voltage to positive line PL3 via diode D1 in synchronization with the turn-off of npn transistor Q2.

Figure 3:
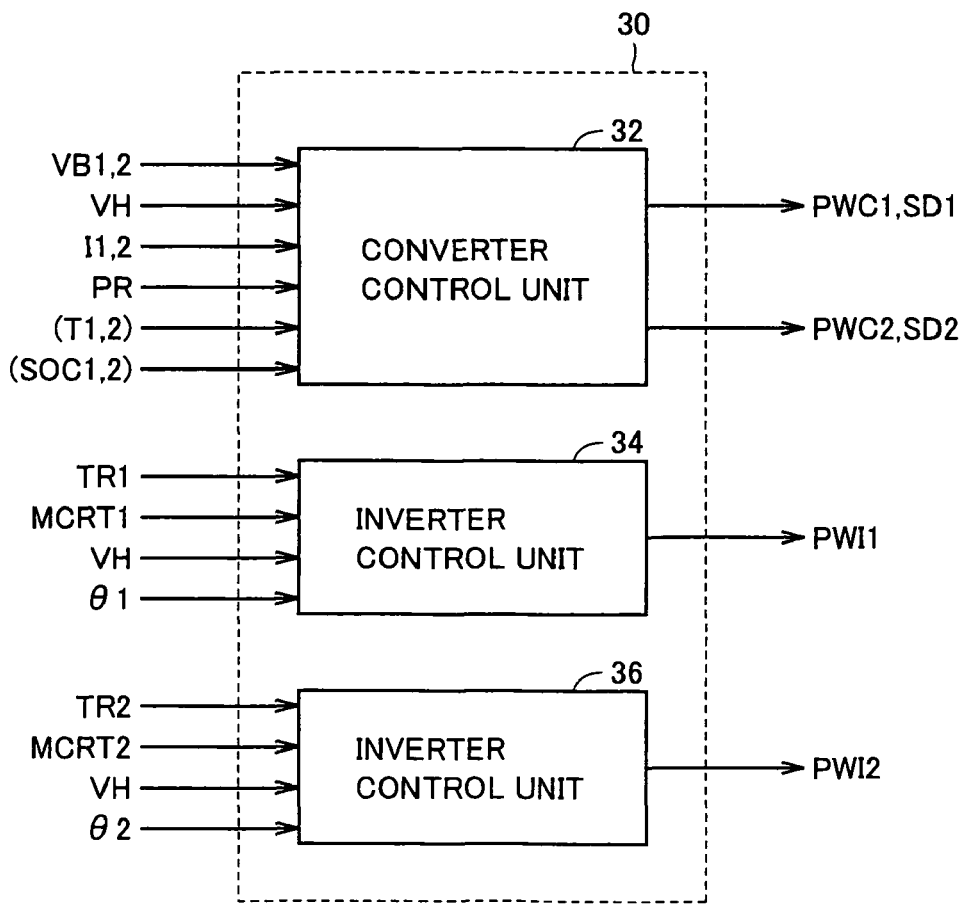
FIG. 3 is a functional block diagram of an ECU shown in FIG. 1.

FIG. 3 is a functional block diagram of ECU 30 shown in FIG. 1. Referring to FIG. 3, ECU 30 includes a converter control unit 32 and inverter control units 34 and 36.

Converter control unit 32 produces a PWM (Pulse Width Modulation) signal for turning on/off npn transistors Q1 and Q2 of converter 10 based on voltage VB1 from voltage sensor 42, voltage VH from voltage sensor 46 and current I1 from current sensor 52, and provides the produced PWM signal to converter 10 as signal PWC1.

Converter control unit 32 also produces a PWM signal for turning on/off npn transistors Q1 and Q2 of converter 12 based on voltage VB2 from voltage sensor 44, voltage VH and current I2 from current sensor 54, and provides the produced PWM signal to converter 12 as signal PWC2.

Further, converter control unit 32 produces shut-down signals SD1 and SD2 for shutting down converters 10 and 12 based on required power PR and voltages VB1 and VB2, and provides shut-down signals SD1 and SD2 thus produced to converters 10 and 12, respectively.

Inverter control unit 34 produces a PWM signal for turning on/off the power transistor included in inverter 20 based on a torque instruction TR1, a motor current MCRT1 and a rotor rotation angle θ1 of motor generator MG1 as well as voltage VH, and provides the produced PWM signal to inverter 20 as signal PWI1.

Inverter control unit 36 produces a PWM signal for turning on/off the power transistor included in inverter 22 based on a torque instruction TR2, a motor current MCRT2 and a rotor rotation angle θ2 of motor generator MG2 as well as voltage VH, and provides the produced PWM signal to inverter 22 as signal PWI2.

Torque instructions TR1 and TR2 are calculated by the vehicle ECU (not shown) based on, e.g., an accelerator press-down degree, a brake pedal press-down degree and a vehicle speed. Further, each of motor currents MCRT1 and MCRT2 and rotor rotation angles θ1 and θ2 is sensed by sensors (not shown).

Figure 4:
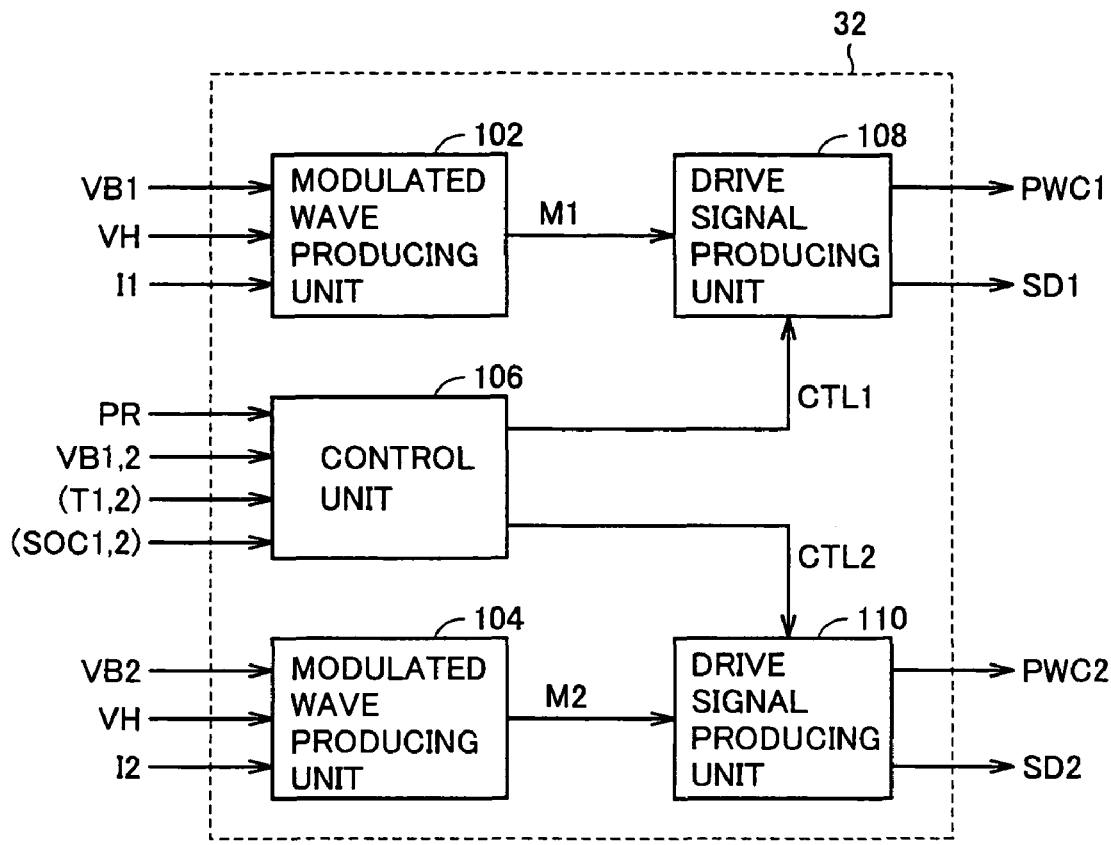
FIG. 4 is a specific functional block diagram of a converter control unit shown in FIG. 3.

FIG. 4 is a specific functional block diagram of converter control unit 32 shown in FIG. 3. Referring to FIG. 4, converter control unit 32 includes modulated wave producing units 102 and 104, a control unit 106 and drive signal producing units 108 and 110.

Modulated wave producing unit 102 produces a modulated wave M1 corresponding to converter 10 based on voltages VB1 and VH and/or current I1. Modulated wave producing unit 104 produces a modulated wave M2 corresponding to converter 12 based on voltages VB2 and VH and/or current I2. Modulated wave producing units 102 and 104 can produce modulated waves M1 and M2 for controlling the input currents or output voltages of the corresponding converters to attain target values, respectively. For example, modulated wave producing unit 102 can produce the modulated wave based on current I1 so that current I1 may be controlled to attain a predetermined target value. Modulated wave producing unit 104 can produce modulated wave M2 based on voltages VB2 and VH so that voltage VH may be controlled to attain a predetermined target value.

In a method to be described later, control unit 106 determines based on required power PR and voltages VB1 and VB2 whether converter 10 or 20 is to be stopped or not. When control unit 106 determines that converter 10 is to be stopped, it activates a signal CTL1 that is output to drive signal producing unit 108. When control unit 106 determines that converter 12 is to be stopped, it activates a signal CTL2 that is output to drive signal producing unit 110.

When signal CTL1 from control unit 106 is inactive, drive signal producing unit 108 produces signal PWC1 based on modulated wave M1 from modulated wave producing unit 102 and a predetermined carrier signal. Conversely, when signal CTL1 is active, it issues shut-down signal SD1 to converter 10.

When signal CTL2 from control unit 106 is inactive, drive signal producing unit 110 produces signal PWC2 based on modulated wave M2 from modulated wave producing unit 104 and a predetermined carrier signal. Conversely, when signal CTL2 is active, it issues shut-down signal SD2 to converter 12.

In converter control unit 32, control unit 106 determines based on required power PR whether one of converters 10 and 12 is to be stopped, or both converters 10 and 12 are to be operated. From the viewpoint of suppressing the whole loss in power storage devices B1 and B2 and converters 10 and 12, control unit 106 determines the number of converter(s) to be operated. A concept about this will now be described below.

Figure 5:
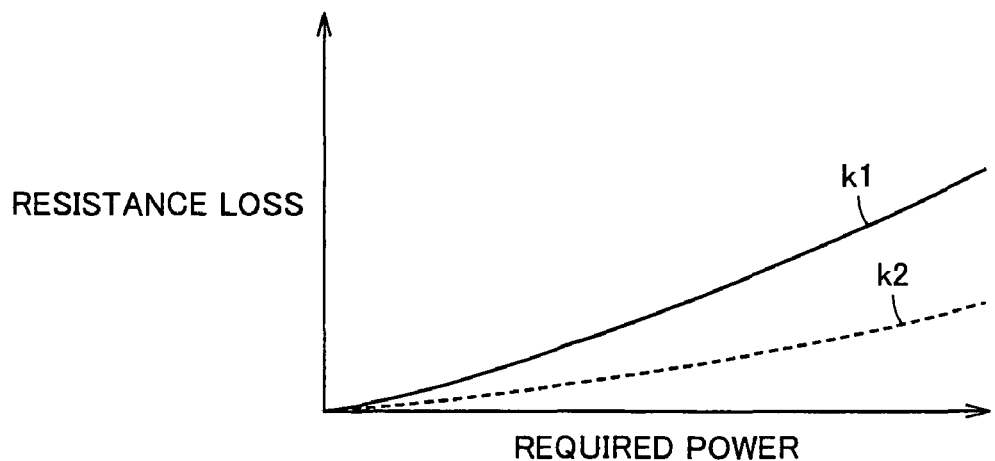
FIG. 5 shows a relationship between a required power and a resistance loss in a power storage device.

FIG. 5 shows a relationship between required power PR and a resistance loss in power storage devices B1 and B2. Referring to FIG. 5, solid line k1 represents a resistance loss of a power storage device corresponding to only any one of converters 10 and 12 that operates. Dotted line k2 represents a sum of resistance losses caused in power storage devices B1 and B2 when both converters 10 and 12 operate.

The resistance loss in the power storage device increases as the required power increases. The resistance loss is proportional to the square of the current. Therefore, the whole resistance loss in power storage devices B1 and B2 can be relatively low when both converters 10 and 12 operate and power storage devices B1 and B2 share the power.

Figure 6:
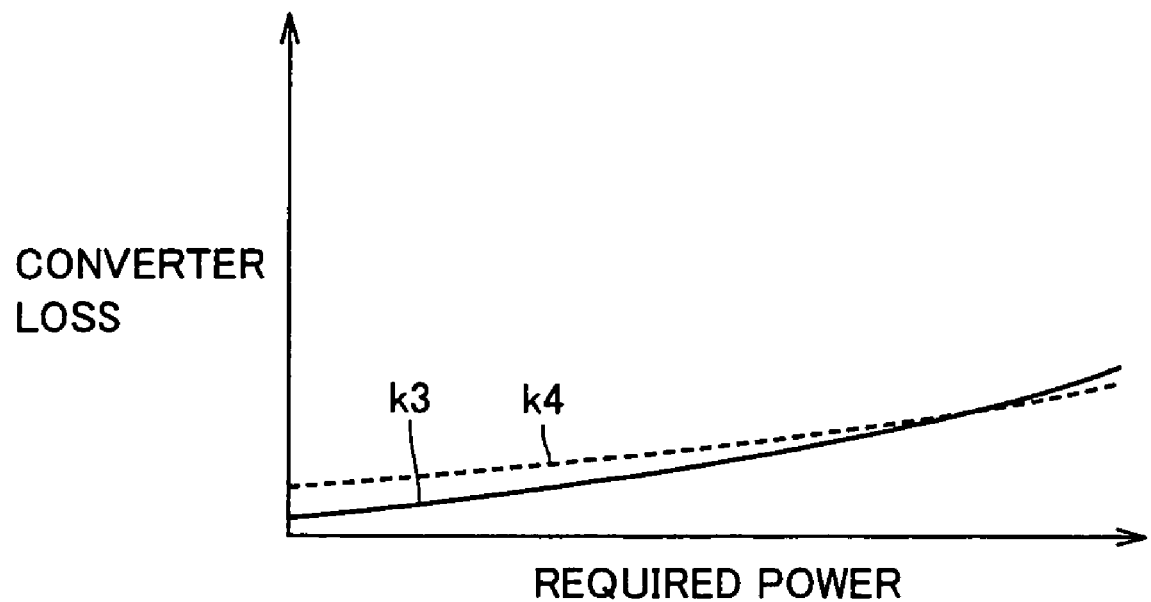
FIG. 6 shows a relationship between the required power and a loss in a converter.

FIG. 6 shows a relationship between required power PR and a loss in converters 10 and 12. Referring to FIG. 6, solid line k3 represents a loss in only any one of converters 10 and 12 that is operated. Dotted line k4 represents a sum of losses caused in converters 10 and 12 when both converters 10 and 12 operate.

The loss in the converter is formed of a switching loss caused by the on/off operations of npn transistors Q1 and Q2 as well as a loss due to the on-resistance. In a region where the required power is relatively small, the switching loss is predominant, and the loss due to the on-resistance will increase as the power increases. At least in a region of a small required power, the whole loss in converters 10 and 12 can be relatively small when one of converters 10 and 12 stops.

Figure 7:
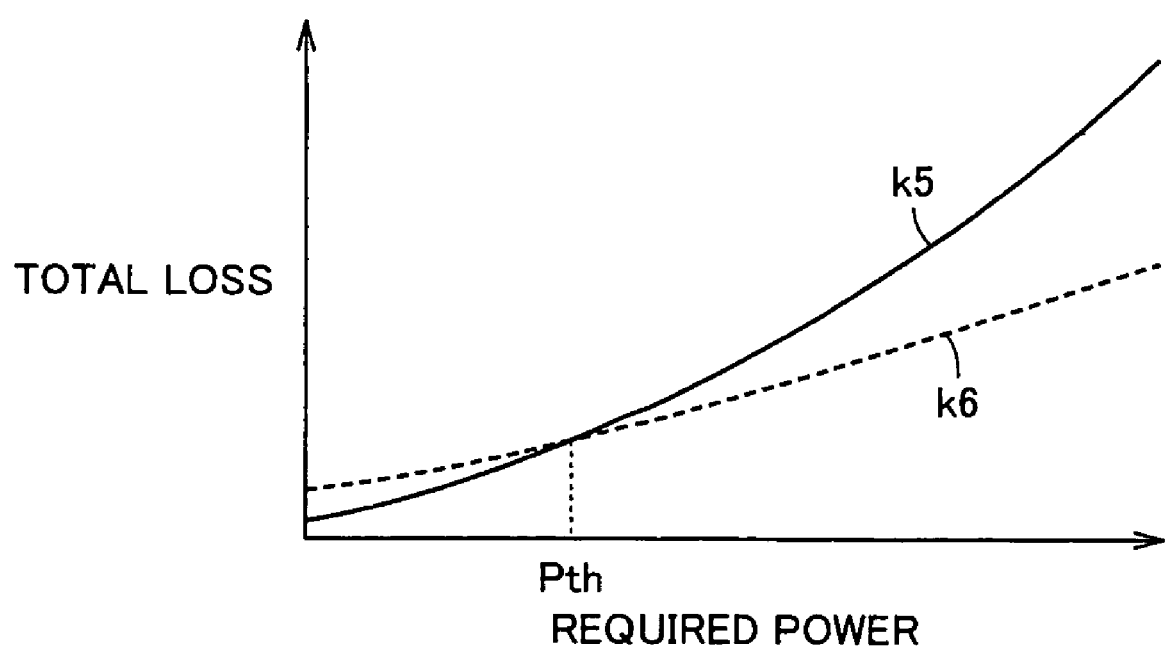
FIG. 7 shows a relationship between the required power and a total loss in the power storage devices and the converters.

FIG. 7 shows a relationship between required power PR and a total loss in power storage devices B1 and B2 and converters 10 and 12. Referring to FIG. 7, solid line k5 represents a total loss (a sum of losses in power storage devices B1 and B2 and converters 10 and 12) that occurs when only one of converters 10 and 12 operates. Dotted line k6 represents the total loss that occurs when both converters 10 and 12 operate. Thus, solid line k5 is a composition of solid line k1 in FIG. 5 and solid line k3 in FIG. 6, and dotted line k6 is a composition of dotted line k2 in FIG. 5 and dotted line k4 in FIG. 6.

In a region of the small required power, as shown in the figures, the loss (primarily the switching loss) in converters is predominant, and the manner of operating only one of converters 10 and 12 causes the total loss smaller than that caused by operating both converters 10 and 12. As the required power increases, the resistance loss in the power storage devices becomes predominant. When the required power exceeds a certain value (Pth), the total loss caused by operating both converters 10 and 12 becomes smaller than that caused by operating only one of converters 10 and 12.

In the first embodiment, the required power at the crossing point of solid line k5 and dotted line k6 is set as a reference value Pth. When required power PR is smaller than reference value Pth, one of converters 10 and 12 stops. When required power PR is equal to or larger than reference value Pth, both converters 10 and 12 operate. Thereby, the total loss can be suppressed.

Referring to FIG. 4 again, when required power PR is smaller than reference value Pth, control unit 106 determines converter 10 or 12 to be stopped, based on voltages VB1 and VB2. More specifically, control unit 106 stops the converter corresponding to the power storage device of a lower voltage.

This is for the following reason. As described above, when the required power PR is smaller than reference value Pth, one of converters 10 and 12 stops so that the total loss can be suppressed. By always keeping an upper arm of the converter to be operated in the on state, the loss (switching loss) can be further suppressed.

However, if the converter corresponding to the power storage device of a higher voltage were stopped, voltage VH would be cramped at the voltage of the power storage device corresponding to the stopped converter (because the upper arm is provided with diode D1). Therefore, the converter to be operated would be required to boost the voltage provided from the corresponding power storage device to voltage VH, and the switching operation would be required.

In contrast to the above, by stopping the converter corresponding to the power storage device of a lower voltage, the above switching operation is not required, and the upper arm of the converter to be operated can always be kept on and the loss can be suppressed.

Figure 8:
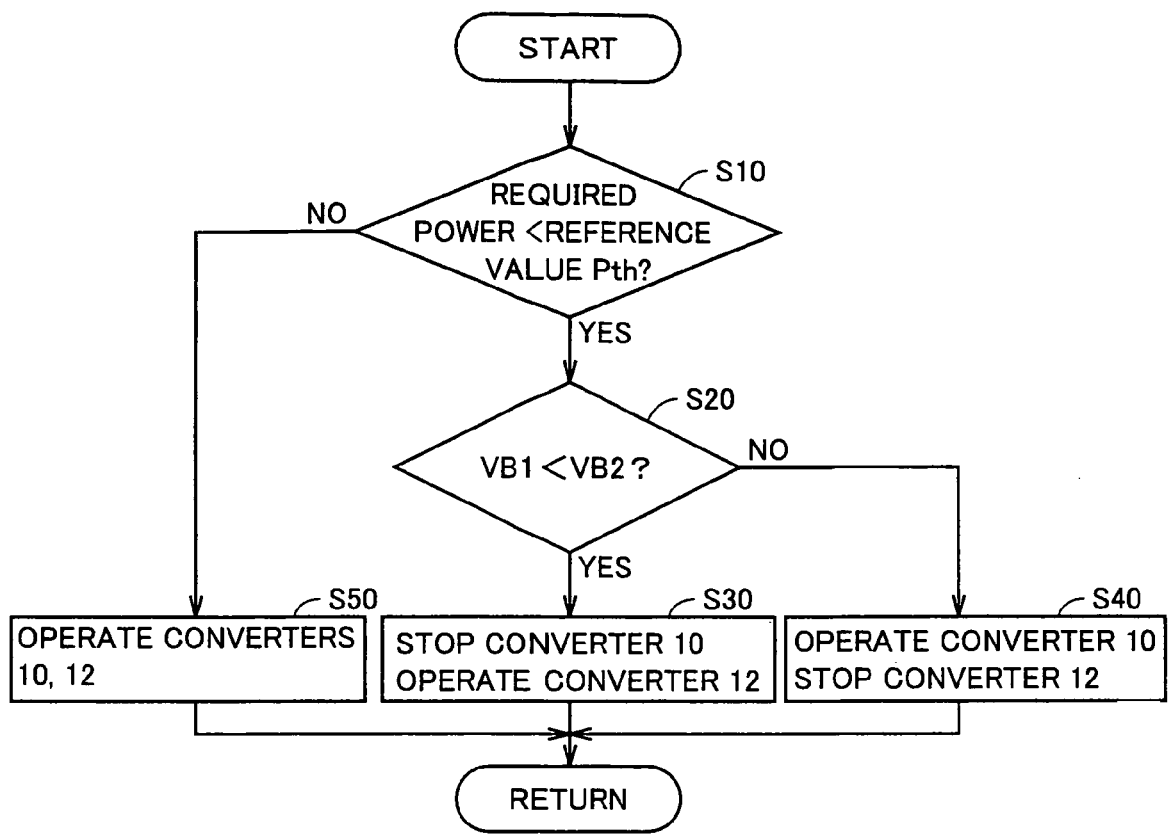
FIG. 8 is a flowchart illustrating a flow of processing in the control unit shown in FIG. 4.

FIG. 8 is a flowchart illustrating a flow of processing in control unit 106 shown in FIG. 4. The processing in this flowchart is called for execution from a main routine at predetermined time intervals or every time predetermined conditions are satisfied.

Referring to FIG. 8, control unit 106 determines whether required power PR received from vehicle ECU is smaller than reference value Pth or not (step S10). When control unit 106 determines that required power PR is smaller than reference value Pth (YES in step S10), it determines whether voltage VB1 of power storage device B1 is lower than voltage VB2 of power storage device B2 or not (step S20).

When control unit 106 determines that voltage VB1 is lower than voltage VB2 (YES in step S20), it stops converter 10, and operates only converter 12 (step S30). More specifically, control unit 106 activates signal CTL1 provided to drive signal producing unit 108 (not shown) corresponding to converter 10, and deactivates signal CTL2 provided to drive signal producing unit 110 (not shown) corresponding to converter 12.

When it is determined in step S20 that voltage VB1 is equal to or higher than voltage VB2 (NO in step S20), control unit 106 stops converter 12 and operates only converter 10 (step S40). More specifically, control unit 106 activates signal CTL2 and deactivates signal CTL1.

When it is determined in step S10 that required power PR is equal to or larger than reference value Pth (NO in step S10), control unit 106 causes both converters 10 and 12 to operate (step S50). More specifically, control unit 106 deactivates both signals CTL1 and CLT2.

In the first embodiment, as described above, when required power PR is smaller than reference value Pth, the converter corresponding to the power storage device of a lower voltage stops. When required power PR is equal to or larger than reference value Pth, both converters 10 and 12 operate. Accordingly, the first embodiment can suppress the loss in the power supply system formed of power storage devices B1 and B2 as well as converters 10 and 12.

When required power PR is smaller than reference value Pth, the converter corresponding to the power storage device of a lower voltage stops so that the upper arm of the converter to be operated can always be kept on. In this case, therefore, the switching loss can also be reduced in the operating converter, and the loss in the power supply system can be further suppressed.

Second Embodiment

In a second embodiment, reference value Pth used for determining whether one of converters 10 and 12 is to be stopped or not is variable according to the temperature of power storage devices B1 and B2.

Figure 9:
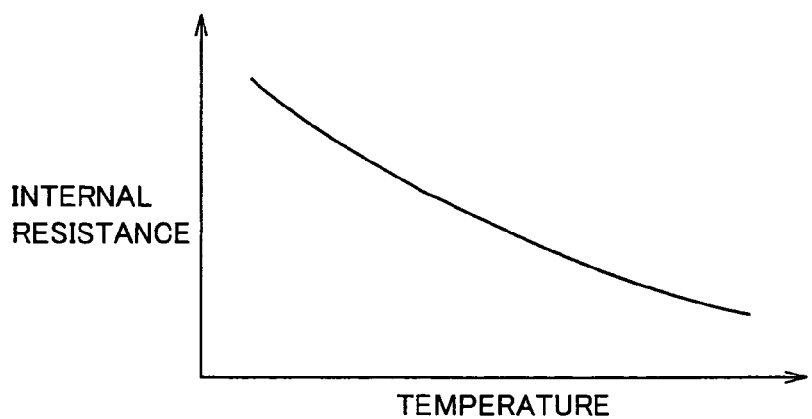
FIG. 9 shows a relationship between a temperature and an internal resistance of the power storage device.
Figure 10:
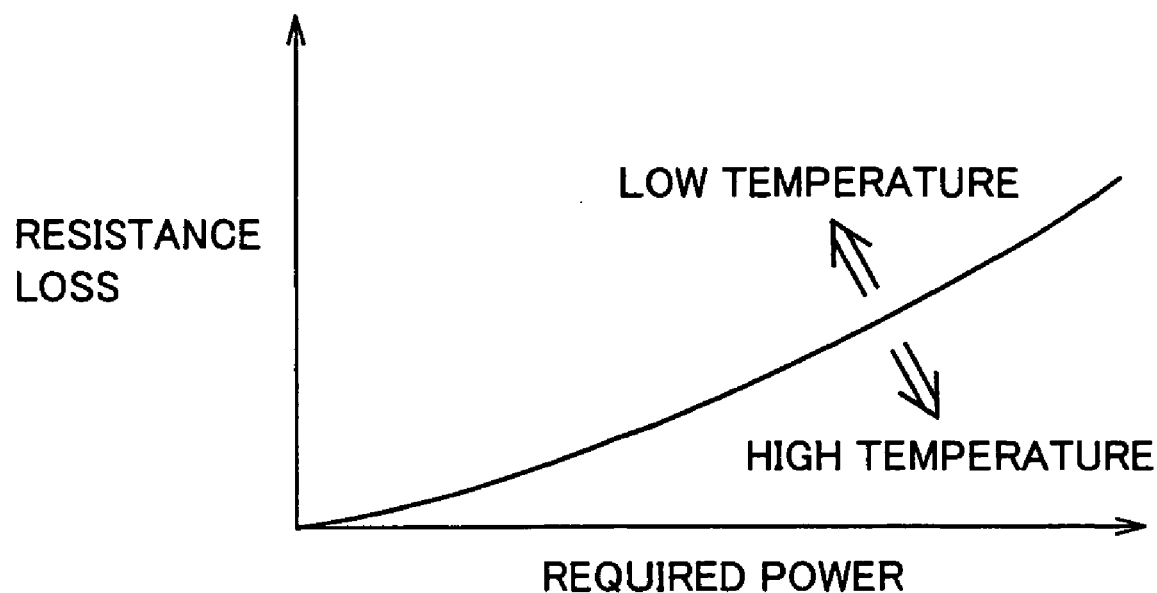
FIG. 10 shows a relationship between the required power and the resistance loss in the power storage device.

FIG. 9 shows a relationship between the temperature and the internal resistance of the power storage device, and FIG. 10 shows a relationship between required power PR and the resistance loss in power storage devices B1 and B2. Referring to FIG. 9, the internal resistance of the power storage device increases with decrease in temperature of the power storage device. Referring to FIG. 10, the resistance loss in the power storage device increases with increase in required power. Since the internal resistance increases with decrease in temperature of the power storage device as described above, the resistance loss in the power storage device further increases with decrease in temperature of the power storage device.

In FIG. 7 showing the total loss in the power supply system, therefore, reference value Pth, which is a criterion value for determination whether both converters 10 and 12 are to be operated or only one of them is to be operated, shifts toward smaller required power PR as the temperature of power storage devices B1 and B2 decreases. Therefore, it is preferable to decrease reference value Pth as the temperature of power storage devices B1 and B2 decreases.

Figure 11:
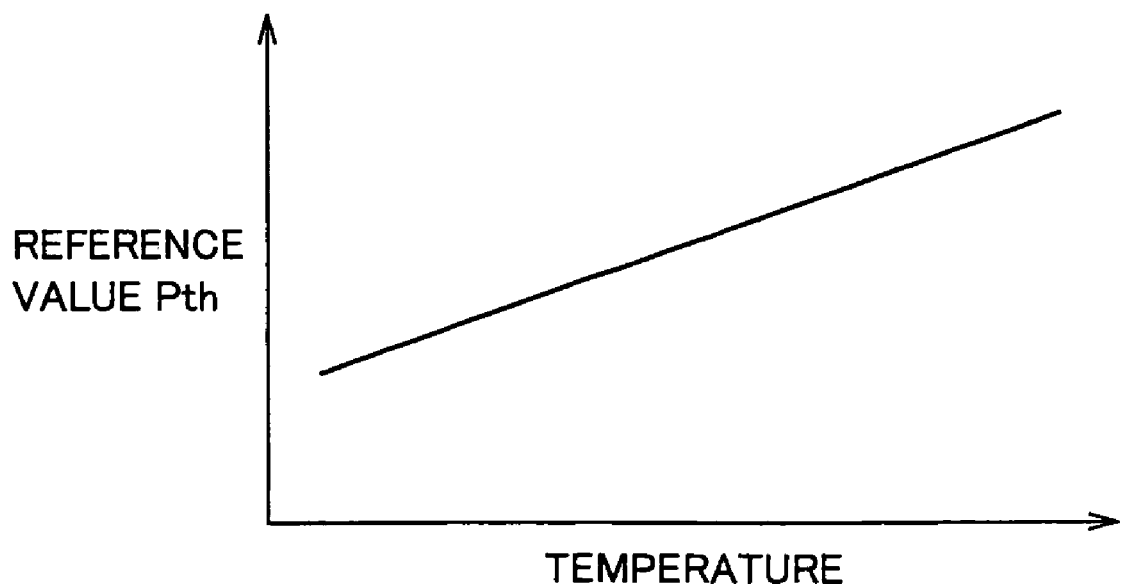
FIG. 11 shows a relationship between a temperature of the power storage device and the reference value.

FIG. 11 shows a relationship between the temperature of power storage devices B1 and B2 and reference value Pth. Referring to FIG. 11, reference value Pth in the second embodiment is set smaller as the temperature of power storage devices B1 and B2 lowers.

The temperature of power storage devices B1 and B2 may be obtained, e.g., by averaging temperatures T1 and T2 of power storage devices B1 and B2. Alternatively, the temperature of the power storage device corresponding to the converter that is to be operated without operating the other, i.e., the temperature of the power storage device of a higher voltage may be used as the temperature of power storage devices B1 and B2.

The whole structure of the hybrid vehicle as well as the structures of the ECU and the converter control unit in the second embodiment are the same as those of the first embodiment. In practice, as shown in FIG. 4, control unit 106 receives temperatures T1 and T2 from temperature sensors 62 and 64, respectively, and changes reference value Pth based on temperatures T1 and T2 in step S10 shown in FIG. 8.

In the second embodiment as described above, reference value Pth is optimized based on temperatures T1 and T2. Therefore, the second embodiment can reliably suppress the total loss in the power supply system.

Third Embodiment

In a third embodiment, reference value Pth is variable according to a State of Charge (SOC) of power storage devices B1 and B2 taking a value between 0% and 100%.

Figure 12:
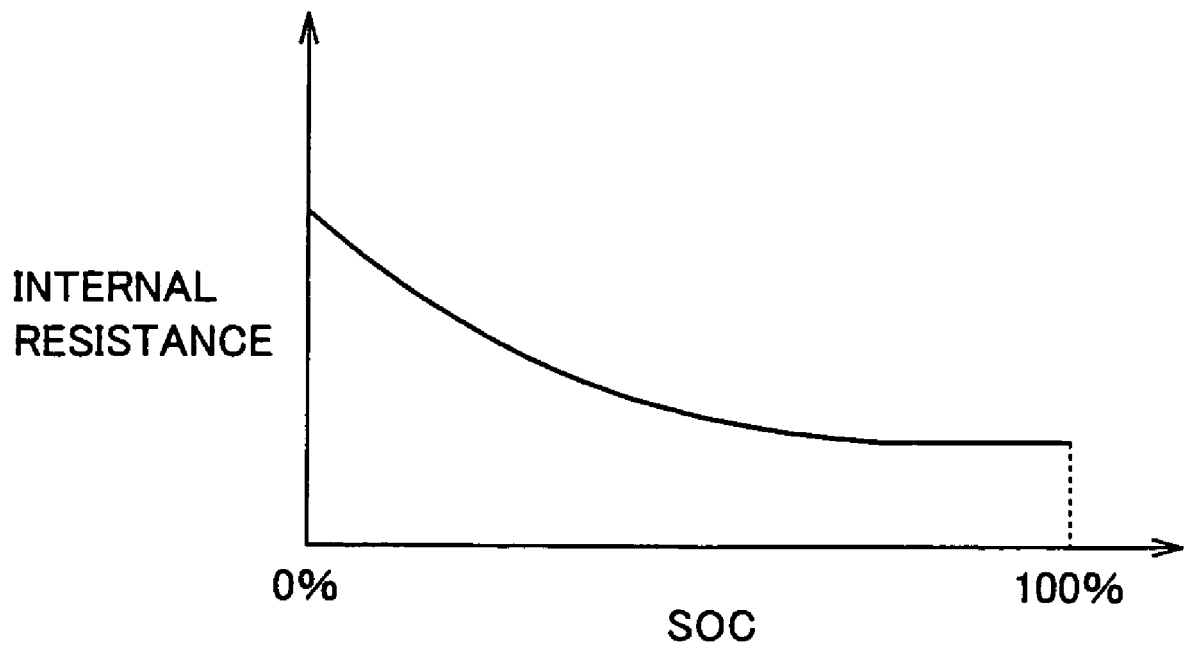
FIG. 12 shows a relationship between an SOC and an internal resistance of the power storage device.
Figure 13:
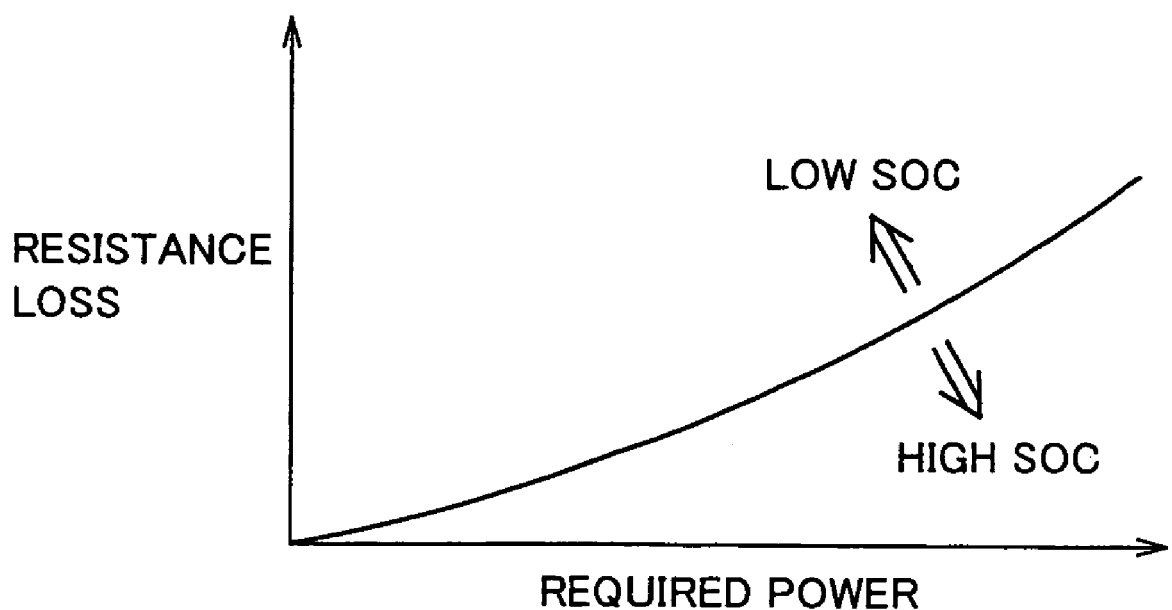
FIG. 13 shows a relationship between the required power and the resistance loss in the power storage device.

FIG. 12 shows a relationship between the SOC and the internal resistance of the power storage device. FIG. 13 shows a relationship between required power PR and the resistance loss in power storage devices B1 and B2. Referring to FIG. 12, the internal resistance of the power storage device increases with decrease in SOC of the power storage device. Referring to FIG. 13, the resistance loss in the power storage device increases with increase in required power. Since the internal resistance increases with decrease in SOC as described above, the resistance loss in the power storage device further increases with decrease in SOC of the power storage device.

Figure 14:
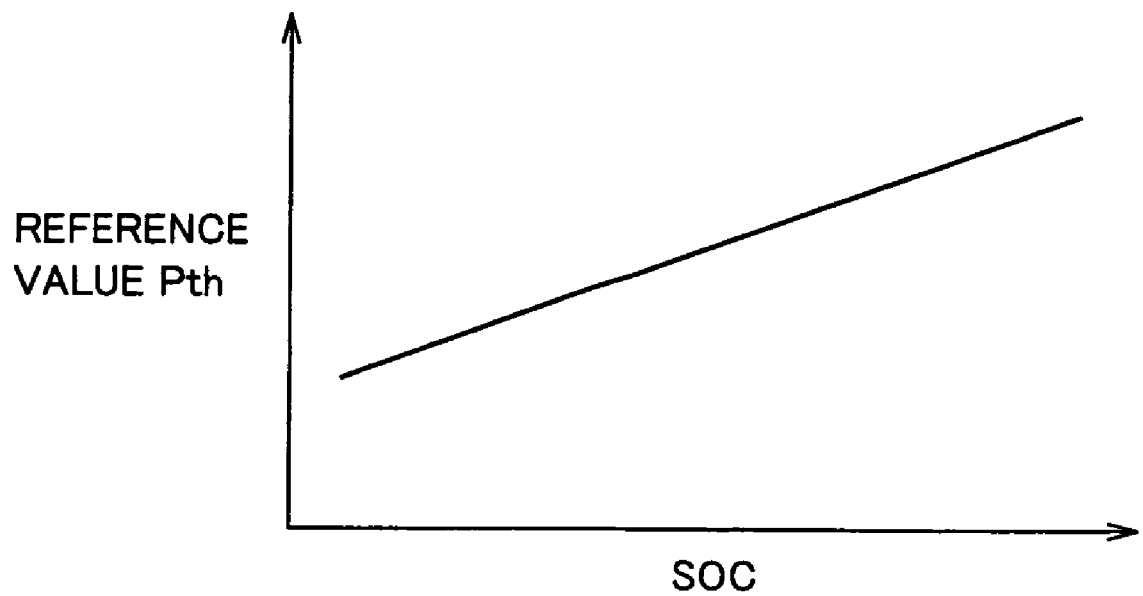
FIG. 14 shows a relationship between the SOC of the power storage device and the reference value.

Therefore, it is preferable to decrease reference value Pth as the SOC of power storage devices B1 and B2 decreases, similarly to the second embodiment. FIG. 14 shows a relationship between the SOC of power storage devices B1 and B2 and reference value Pth. Referring to FIG. 14, reference value Pth in the third embodiment is set to a lower value as the SOC of power storage devices B1 and B2 decreases.

The SOC of power storage devices B1 and B2 may be obtained, e.g., by averaging a state of charge SOC1 indicating the SOC of power storage device B1 and a state of charge SOC2 indicating the SOC of power storage device B2. Alternatively, the SOC of the power storage device corresponding to the converter that is to be operated without operating the other, i.e., the SOC of the power storage device of a higher voltage may be used as the SOC of power storage devices B1 and B2.

The whole structure of the hybrid vehicle as well as the structures of the ECU and the converter control unit in the third embodiment are the same as those of the first embodiment. In practice, control unit 106 receives states of charge SOC1 and SOC2 as shown in FIG. 4, changes reference value Pth based on states of charge SOC1 and SOC2 in step S10 shown in FIG. 8. State of charge SOC1 (or SOC2) can be calculated by various known methods using voltage VB1 (or VB2), current I1 (or I2), temperature T1 (or T2) and the like.

In the third embodiment as described above, reference value Pth is optimized based on the SOC of power storage devices B1 and B2. Therefore, the third embodiment can reliably suppress the total loss in the power supply system.

Fourth Embodiment

In a fourth embodiment, reference value Pth is variable according to the switching frequency of converters 10 and 12.

Figure 15:
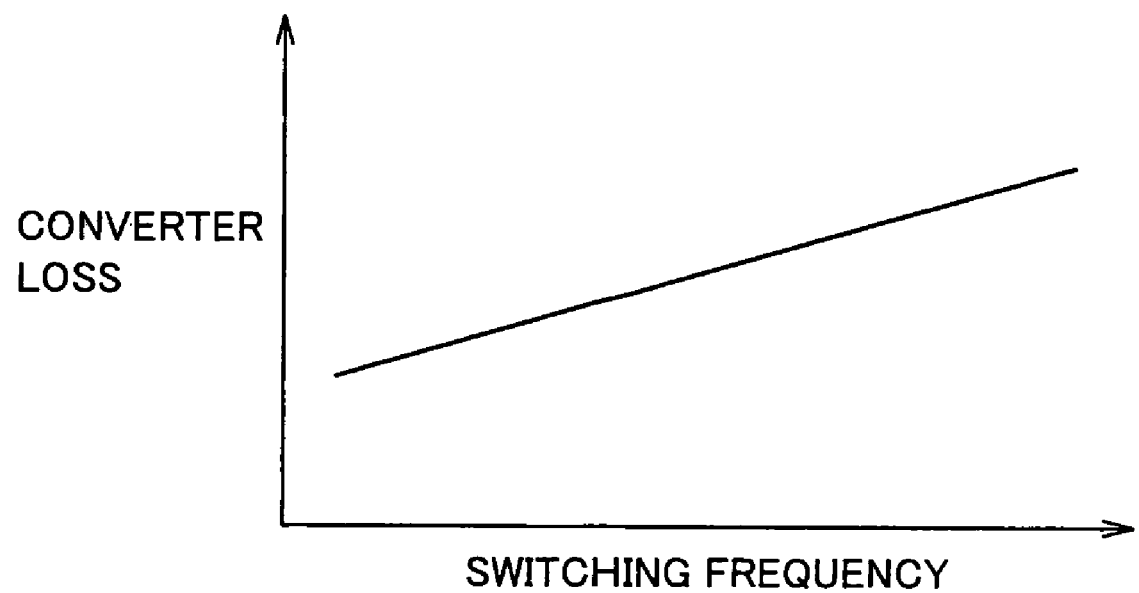
FIG. 15 illustrates a relationship between a switching frequency of the converter and a loss in the converter.

FIG. 15 shows a relationship between the switching frequency of converters 10 and 12 and the loss in converters 10 and 12. Referring to FIG. 15, when the switching frequency increases, the switching loss increases and the loss in the converter increases.

In FIG. 7 showing the total loss in the power supply system, therefore, reference value Pth, which is a criterion value for determination whether both converters 10 and 12 are to be operated or only one of them is to be operated, shifts toward smaller required power PR as the switching frequency of converters 10 and 12 increases. Therefore, it is preferable to increase reference value Pth as the switching frequency of converters 10 and 12 increases.

Figure 16:
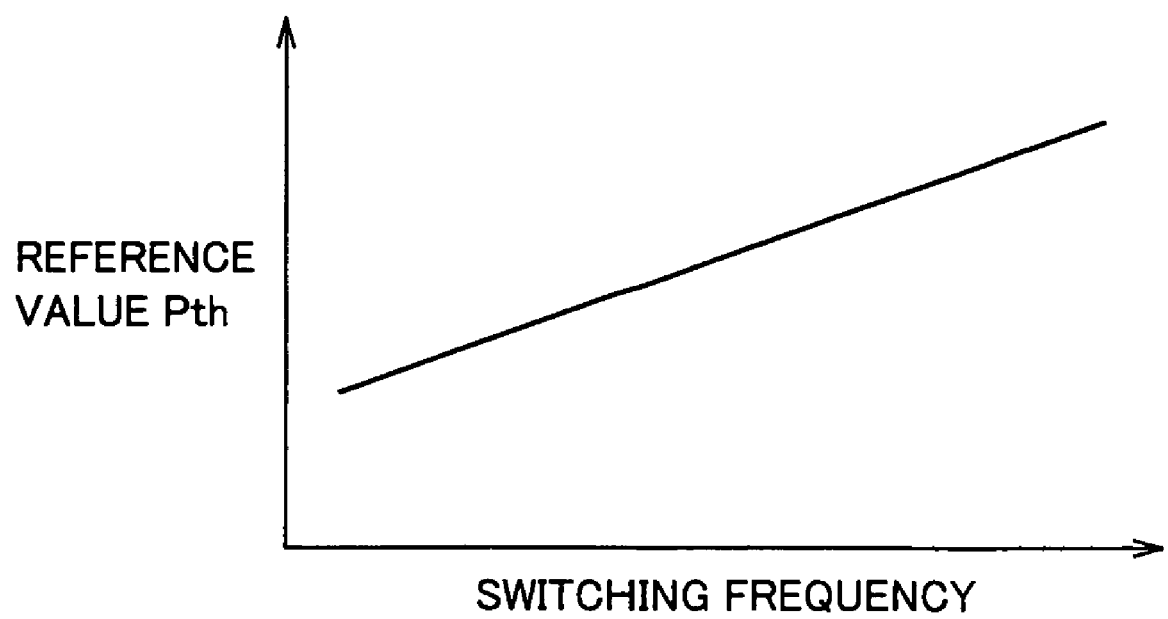
FIG. 16 shows a relationship between the switching frequency of the converter and the reference value.

FIG. 16 shows a relationship between the switching frequency of converters 10 and 12 and reference value Pth. Referring to FIG. 16, reference value Pth in the fourth embodiment is set larger as the switching frequency of converters 10 and 12 rises.

The whole structure of the hybrid vehicle as well as the structures of the ECU and the converter control unit in the fourth embodiment are the same as those of the first embodiment. In practice, control unit 106 changes reference value Pth based on the carrier frequency of converters 10 and 12 in step S10 shown in FIG. 8.

According to the fourth embodiment, as described above, reference value Pth is optimized based on the switching frequency of converters 10 and 12. Therefore, the fourth embodiment can likewise suppress reliably the total loss in the power supply system.

In each of the embodiments already described, the control in control unit 106 is practically performed by a CPU (Central Processing Unit). The CPU reads a program having respective steps in the flowchart of FIG. 8 from a ROM (Read Only Memory), and executes the read program to execute the processing according to the flowchart shown in FIG. 8. Therefore, the ROM corresponds to a computer-readable (CPU-readable) recording medium bearing the program that includes the respective steps in the flowchart shown in FIG. 8.

The embodiments have been described in connection with a so-called series/parallel type of hybrid vehicle in which power split device 4 is used for distributing the power of engine 2 to motor generator MG1 and wheels 6. However, the invention can be applied to a so-called series type of hybrid vehicle in which the power of engine 2 is used only for the electric power generation by motor generator MG1, and the drive power for the vehicle is generated only by motor generator MG2.

The invention can be applied to an electric vehicle that does not include engine 2 and can be driven only by the electric power, and also to a fuel-cell vehicle further including a fuel cell as a power source.

In the foregoing description, power storage devices B1 and B2 correspond to the "first power storage device" and "second power storage device" in the invention, respectively, and converters 10 and 12 correspond to the "first voltage converting device" and "second voltage converter device" in the invention, respectively. Further, inverters 20 and 22 form the "drive device" in the invention, and motor generators MG1 and MG2 correspond to the "electric motor" in the invention.

Although the present invention has been described and illustrated in detail, it is clearly understood that the same is by way of illustration and example only and is not to be taken by way of limitation, the scope of the present invention being interpreted by the terms of the appended claims.

The invention claimed is:

1. A power supply system provided with a plurality of power storage devices, comprising:
   a first voltage converting device arranged between a first power storage device and a load device for converting a voltage provided from said first power storage device and providing the converted voltage to said load device;
   a second voltage converting device arranged between a second power storage device and said load device for converting a voltage provided from said second power storage device and providing the converted voltage to said load device; and
   a control unit controlling said first and second voltage converting devices such that one of said first and second voltage converting devices operates and the other voltage converting device stops when a required power of the power supply system is smaller than a reference value, and controlling said first and second voltage converting devices such that both of said first and second voltage converting devices operate when said required power is equal to or larger than said reference value;
   wherein, when said required power is smaller than said reference value, said control unit stops the voltage converting device corresponding to one of said first and second power storage devices providing a lower output voltage than the other.

2. A power supply system provided with a plurality of power storage devices, comprising:

a first voltage converting device arranged between a first power storage device and a load device for converting a voltage provided from said first power storage device and providing the converted voltage to said load device;

a second voltage converting device arranged between a second power storage device and said load device for converting a voltage provided from said second power storage device and providing the converted voltage to said load device; and a control unit controlling said first and second voltage converting devices such that one of said first and second voltage converting devices operates and the other voltage converting device stops when a required power of the power supply system is smaller than a reference value, and controlling said first and second voltage converting devices such that both of said first and second voltage converting devices operate when said required power is equal to or larger than said reference value;

wherein said reference value is determined based on a resistance loss in said first and second power storage devices and a switching loss in said first and second voltage converting devices.

3. A power supply system provided with a plurality of power storage devices, comprising:

a first voltage converting device arranged between a first power storage device and a load device for converting a voltage provided from said first power storage device and providing the converted voltage to said load device;

a second voltage converting device arranged between a second power storage device and said load device for converting a voltage provided from said second power storage device and providing the converted voltage to said load device; and a control unit controlling said first and second voltage converting devices such that one of said first and second voltage converting devices operates and the other voltage converting device stops when a required power of the power supply system is smaller than a reference value, and controlling said first and second voltage converting devices such that both of said first and second voltage converting devices operate when said required power is equal to or larger than said reference value;

wherein said control unit changes said reference value such that said reference value increases as a state of charge representing a charged state of said first and second power storage devices becomes high.

4. A power supply system provided with a plurality of power storage devices, comprising:

a first voltage converting device arranged between a first power storage device and a load device for converting a voltage provided from said first power storage device and providing the converted voltage to said load device;

a second voltage converting device arranged between a second power storage device and said load device for converting a voltage provided from said second power storage device and providing the converted voltage to said load device; and a control unit controlling said first and second voltage converting devices such that one of said first and second voltage converting devices operates and the other voltage converting device stops when a required power of the power supply system is smaller than a reference value, and controlling said first and second voltage converting devices such that both of said first and second voltage converting devices operate when said required power is equal to or larger than said reference value;

wherein said control unit changes said reference value such that said reference value increases as a switching frequency of said first and second voltage converting devices becomes high.

5. A method of controlling a power supply system provided with a plurality of power storage devices, wherein said power supply system includes:

a first voltage converting device arranged between a first power storage device and a load device for converting a voltage provided from said first power storage device and providing the converted voltage to said load device; and a second voltage converting device arranged between a second power storage device and said load device for converting a voltage provided from said second power storage device and providing the converted voltage to said load device, and said control method comprises:

a first step of comparing a required power of said power supply system with a reference value;

a second step of controlling said first and second voltage converting devices such that one of said first and second voltage converting devices operates and the other voltage converting device stops, when said required power is smaller than the reference value; and a third step of controlling said first and second voltage converting devices such that both of said first and second voltage converting devices operate, when said required power is equal to or larger than said reference value;

wherein said second step further includes:

a first sub-step of comparing an output voltage of said first power storage device with an output voltage of said second power storage device, a second sub-step of stopping said first voltage converting device when the output voltage of said first power storage device is lower than the output voltage of said second power storage device, and a third sub-step of stopping said second voltage converting device when the output voltage of said second power storage device is lower than the output voltage of said first power storage device.

6. A method of controlling a power supply system provided with a plurality of power storage devices, wherein said power supply system includes:

a first voltage converting device arranged between a first power storage device and a load device for converting a voltage provided from said first power storage device and providing the converted voltage to said load device; and a second voltage converting device arranged between a second power storage device and said load device for converting a voltage provided from said second power storage device and providing the converted voltage to said load device, and said control method comprises:

a first step of comparing a required power of said power supply system with a reference value;

a second step of controlling said first and second voltage converting devices such that one of said first and second voltage converting devices operates and the other voltage converting device stops, when said required power is smaller than the reference value; and a third step of controlling said first and second voltage converting devices such that both of said first and second voltage converting devices operate, when said required power is equal to or larger than said reference value;

wherein said reference value is determined based on a resistance loss in said first and second power storage devices and a switching loss in said first and second voltage converting devices.

7. A method of controlling a power supply system provided with a plurality of power storage devices, wherein said power supply system includes:

a first voltage converting device arranged between a first power storage device and a load device for converting a voltage provided from said first power storage device and providing the converted voltage to said load device; and a second voltage converting device arranged between a second power storage device and said load device for converting a voltage provided from said second power storage device and providing the converted voltage to said load device, and said control method comprises:

a first step of comparing a required power of said power supply system with a reference value;

a second step of controlling said first and second voltage converting devices such that one of said first and second voltage converting devices operates and the other voltage converting device stops, when said required power is smaller than the reference value; and a third step of controlling said first and second voltage converting devices such that both of said first and second voltage converting devices operate, when said required power is equal to or larger than said reference value;

wherein said reference value is set to increase as a state of charge indicating a charged state of said first and second power storage devices becomes high.

8. A method of controlling a power supply system provided with a plurality of power storage devices, wherein said power supply system includes:

a first voltage converting device arranged between a first power storage device and a load device for converting a voltage provided from said first power storage device and providing the converted voltage to said load device; and a second voltage converting device arranged between a second power storage device and said load device for converting a voltage provided from said second power storage device and providing the converted voltage to said load device, and said control method comprises:

a first step of comparing a required power of said power supply system with a reference value;

a second step of controlling said first and second voltage converting devices such that one of said first and second voltage converting devices operates and the other voltage converting device stops, when said required power is smaller than the reference value; and a third step of controlling said first and second voltage converting devices such that both of said first and second voltage converting devices operate, when said required power is equal to or larger than said reference value;

wherein said reference value is set to increase as a switching frequency of said first and second voltage converting devices becomes high.

* * * * *